(12) United States Patent
Brütt et al.

(10) Patent No.: US 12,454,258 B2
(45) Date of Patent: Oct. 28, 2025

(54) TRAILER CONTROL VALVE OF A TOWING VEHICLE

(71) Applicant: ZF CV Systems Global GmbH, Bern (CH)

(72) Inventors: Mirko Brütt, Springe (DE); Jan Spremberg, Wennigsen (DE)

(73) Assignee: ZF CV Systems Global GmbH, Bern (CH)

( * ) Notice: Subject to any disclaimer, the term of this patent is extended or adjusted under 35 U.S.C. 154(b) by 34 days.

(21) Appl. No.: 18/687,523

(22) PCT Filed: Jul. 25, 2022

(86) PCT No.: PCT/EP2022/070727
§ 371 (c)(1),
(2) Date: Feb. 28, 2024

(87) PCT Pub. No.: WO2023/030756
PCT Pub. Date: Mar. 9, 2023

(65) Prior Publication Data
US 2024/0351565 A1 Oct. 24, 2024

(30) Foreign Application Priority Data
Aug. 30, 2021 (DE) .................... 10 2021 122 322.9

(51) Int. Cl.
*B60T 13/68* (2006.01)
*B60T 8/17* (2006.01)
*B60T 13/66* (2006.01)

(52) U.S. Cl.
CPC .......... *B60T 13/686* (2013.01); *B60T 8/1708* (2013.01); *B60T 13/662* (2013.01)

(58) Field of Classification Search
CPC .... B60T 13/686; B60T 13/662; B60T 13/683; B60T 8/1708; B60T 11/108; B60T 7/20
See application file for complete search history.

(56) References Cited

U.S. PATENT DOCUMENTS 4,552,398 A * 11/1985 Risley .................... B60T 15/46
303/7
10,549,742 B2 2/2020 Boulivan
(Continued)

FOREIGN PATENT DOCUMENTS

DE 20 2018 001 859 5/2018
EP 3 266 661 A1 1/2018

OTHER PUBLICATIONS

German Patent Office, German Search Report issued in German Patent application No. 10 2021 122 322.9 (Apr. 12, 2022).
(Continued)

*Primary Examiner* — George C Jin
(74) *Attorney, Agent, or Firm* — Finch & Maloney PLLC (57) ABSTRACT

A trailer control valve for controlling a hydraulic dual-line brake system of a trailer vehicle has an inlet for a hydraulic supply line of the towing vehicle, a tank outlet for an unpressurized return-flow line of the towing vehicle, a brake pressure outlet, and a supplemental pressure outlet. The brake pressure outlet can be connected in a stepped manner with an electronically controlled brake control valve to the supply pressure inlet or to the tank outlet. The supplemental pressure outlet can connect using a valve arrangement so that an outlet pressure of the supply pressure is reduced to a supplemental pressure at the supply pressure inlet or at the tank outlet. The valve arrangement has a pressure-limiting valve and a shut-off valve arranged in series. The shut-off valve can be a 3/2-way valve, which when not energized, the supplemental pressure outlet is connected to the tank outlet.

22 Claims, 8 Drawing Sheets

(56) References Cited

U.S. PATENT DOCUMENTS

| | | |
|---|---|---|
| 10,933,854 B2 | 3/2021 | Bruett et al. |
| 11,970,146 B2 | 4/2024 | Haverkamp et al. |
| 2020/0139953 A1* | 5/2020 | Dombek ................. B60T 8/885 |
| 2020/0223414 A1* | 7/2020 | Brütt ..................... B60T 13/263 |
| 2021/0268999 A1 | 9/2021 | Prigent |
| 2021/0269003 A1 | 9/2021 | Prigent |
| 2021/0300311 A1* | 9/2021 | Brütt ..................... B60T 13/683 |
| 2023/0303045 A1* | 9/2023 | Klostermann ........ B60T 13/683 |
| 2024/0001900 A1* | 1/2024 | Kirmaier .................. B60T 7/20 |

OTHER PUBLICATIONS

"Regulation (EU) No. 167/2013 of the European Parliament and of the Council as regards vehicle braking requirements in relation to the type-approval of agricultural and forestry vehicles", Official Journal of the European Union, Oct. 15, 2014 (9 pages).

European Patent Office, International Search Report issued in International patent application No. PCT/EP2022/070727 (Nov. 29, 2022).

European Patent Office, Written Opinion issued in International patent application No. PCT/EP2022/070727 (Nov. 29, 2022).

* cited by examiner

TRAILER CONTROL VALVE OF A TOWING VEHICLE

RELATED APPLICATIONS

This application claims the benefit under 35 U.S.C. § 371 as a U.S. National Phase Application of application no. PCT/EP2022/070727, filed on 25 Jul. 2022, which claims the benefit of German Patent Application no. 10 2021 122 322.9 filed on 30 Aug. 2021, the contents of which are hereby incorporated herein by reference in their entireties.

FIELD OF THE DISCLOSURE

The invention relates to a trailer control valve of a towing vehicle for controlling a hydraulic dual-line brake system of a trailer vehicle, with a supply pressure inlet for connecting a hydraulic supply pressure of the towing vehicle, with a tank outlet for connecting an unpressurized return-flow line of the towing vehicle, with a brake pressure outlet for connecting a brake line of the trailer vehicle, and with a supplemental pressure outlet for connecting a supplemental line of the trailer vehicle, in which the brake pressure outlet can be connected in a stepped manner by means of an electronically controlled brake control valve to the supply pressure inlet or to the tank outlet, and in which the supplemental pressure outlet can be connected via a valve arrangement comprising at least one electronically controlled valve, either to the supply pressure inlet, thereby reducing an outlet pressure of the supply pressure to a supplemental pressure, or to the tank outlet.

BACKGROUND

Pursuant to EU Directive No. 2015/68, which relates to brake systems of vehicles and trailers mainly for use in agriculture and forestry, from time-points mentioned therein only vehicles and trailers with dual-line brake systems can be newly licensed. This applies both for vehicles and trailers equipped with compressed-air brake systems and also for vehicles and trailers comprising hydraulic brake systems.

In trailer vehicles with dual-line compressed-air brake systems, analogously to trailer vehicles mainly provide for use in road traffic, between the towing vehicle and the trailer vehicle, during operation there is provided between the towing vehicle and the trailer vehicle in each case a supply line under a high supply pressure for delivering compressed air as an energy carrier, and a brake control line for delivering a variable brake control pressure for the actuation of a brake control valve in the trailer vehicle.

Otherwise than this, in trailer vehicles with a hydraulic brake system there is provided in each case a brake line for the delivery of pressure oil as the energy carrier and a variable brake pressure between 0 and $150\times10^5$ Pa for operating the service brakes of the trailer vehicle, and also a supplemental line for delivering a constant supplemental pressure between $15\times10^5$ Pa and $35\times10^5$ Pa for controlling safety functions of the brake system of the trailer vehicle. The safety functions are as follows: the triggering of an emergency braking operation of the trailer vehicle if the brake line and/or the supplemental line splits, the triggering of an emergency braking operation of the trailer vehicle if an emergency off-switch is actuated in the towing vehicle, the triggering of an auxiliary braking operation of the trailer vehicle via a pressure reservoir of the trailer vehicle if the brake pedal in the towing vehicle is actuated very firmly and, if the trailer vehicle is equipped with spring-loaded brake cylinders, the application and release of the holding brake of the trailer vehicle.

From EP 3 266 661 B1 a hydraulic brake system of a trailer vehicle is known, which is provided for the operation of a hydraulic dual-line brake system of the trailer vehicle, but which is also compatible with a trailer control valve of a towing vehicle for a single-line brake system of a trailer vehicle. The brake system comprises a coupling assembly, a valve assembly, and a pressure regulation group. The coupling assembly has a connecting coupling for the connection of a brake line that can be connected to a brake line coupling of the towing vehicle, a connecting coupling for the connection of a supplemental line to a supplemental line coupling of the towing vehicle, and a short-circuit coupling. With a trailer control valve of the towing vehicle designed for a hydraulic dual-line brake system of the trailer vehicle, the brake line and the supplemental line are connected to the corresponding couplings of the towing vehicle. With a trailer control valve designed for a hydraulic single-line brake system of the trailer vehicle, the brake line is connected to the brake line coupling of the towing vehicle and the end of the supplemental line on the towing-vehicle side is connected to the short-circuit coupling of the trailer vehicle or the coupling assembly.

The valve assembly comprises a pressure-controlled 3/2-way switching valve and a manually actuated 2/2-way switching valve. The 3/2-way switching valve is to a large extent controlled by the supplemental pressure in the supplemental line. When the supplemental pressure is low, the 3/2-way switching valve is in its rest position, in which the brake line is connected to a pressure reservoir and to an inlet of the pressure regulating group via a one-way valve that blocks in the return-flow direction. When the supplemental pressure is high, the 3/2-way switching valve is in its switching position in which the connecting coupling of the brake line is connected directly to the inlet of the pressure regulating group and, by way of a one-way valve that blocks in the return-flow direction, to the pressure reservoir. By means of the 2/2-way switching valve, when the brake line is unpressurized the pressure reservoir can if necessary be emptied. The pressure regulating group comprises a pressure regulating valve which is in the form of a 2/2-way proportional solenoid valve. The proportional valve, to the outlet pressure connection of which are connected wheel-brake cylinders of the trailer vehicle, serves to modulate the brake pressure acting in the wheel-brake cylinders as a function of the loading condition of the trailer vehicle. Further properties and the mode of operation of this known hydraulic brake system in particular operating situations, can be found in a detailed description given in EP 3 266 661 B1.

Furthermore, in EP 3 353 027 B1 a hydraulic brake system for a trailer vehicle is described, which comprises a trailer control valve arranged in a towing vehicle and a valve module arranged in the trailer vehicle, which are connected to one another by a brake line and a supplemental line. The trailer control valve comprises a supply pressure inlet for the connection of a hydraulic supply line of the towing vehicle that delivers a supply pressure, a tank outlet for the connection of an unpressurized return-flow line of the towing vehicle, a brake pressure outlet for connecting the brake line, and a supplemental pressure outlet for connecting the supplemental line. The brake pressure outlet can be connected to the supply pressure inlet or the tank outlet in a stepped manner by means of a brake control valve in the form of a proportional solenoid valve. The supplemental pressure outlet can also be connected in a stepped manner to the supply pressure inlet or to the tank outlet by a supplemental control valve in the form of a proportional solenoid valve. To detect the brake pressure applied at the brake pressure outlet, a pressure sensor is connected between the working outlet of the brake control valve and the brake pressure outlet. To measure the supplemental pressure at the supplemental pressure outlet, a pressure sensor is connected between the working outlet of the supplemental control valve and the control pressure outlet.

The valve module comprises a pressure-controlled 3/3-way proportional valve. By way of the 3/2-way switching valve, which is connected on the input side to the brake line, and which is controlled by the pressure difference between the brake pressure and a supply pressure of a connected pressure accumulator, the pressure accumulator is filled with a pressure medium provided that the supply pressure is lower than the brake pressure. By way of the 3/3-way proportional valve, which is connected on its inlet side via the 3/2-way switching valve to the brake line and directly to the pressure accumulator, and which is controlled by the pressure difference between the brake pressure in a main brake line connected on an outlet side in order to actuate the service brakes of the trailer vehicle and the braking pressure as well as the supplemental pressure, the main brake line is connected either to the brake line and the storage container, or only to the brake line, or only to the storage container. In contrast the supplemental line is connected only by way of a connecting line to a parking brake line for applying and releasing the holding brakes of the trailer vehicle that can be actuated by spring-loaded brake cylinders.

SUMMARY

Against this background, the purpose of the present invention is to provide a trailer control valve of a towing vehicle for controlling a hydraulic dual-line brake system of a trailer vehicle of the type described to begin with, which is configured as simply and inexpensively as possible, and fulfills the requirement to control the brake system of the trailer vehicle in accordance with the EU Directive 2015/68 mentioned earlier.

This objective is achieved by a trailer control valve as disclosed herein. The same applies to a trailer control valve with the features specified in the present disclosure, in which two valves are interchanged with one another in their arrangement. Further advantageous design features of these trailer control valves will be apparent from the present disclosure.

Accordingly, the invention relates to the first variant of a trailer control valve of a towing vehicle for controlling a hydraulic dual-line brake system of a trailer vehicle. The trailer control valve comprises a supply pressure inlet for connecting a hydraulic supply line of the towing vehicle, a tank outlet for connecting an unpressurized return-flow line of the towing vehicle, a brake pressure outlet for connecting a brake line of the trailer vehicle, and a supplemental pressure outlet for connecting a supplemental line of the trailer vehicle. The brake pressure outlet can be connected in a stepped manner to the supply pressure inlet or to the tank outlet by means of an electronically controlled brake control valve. In addition, the supplemental pressure outlet can be connected by way of a valve arrangement comprising at least one electronically controlled valve, either to the supply pressure inlet, so reducing an initial pressure value of the supply pressure to a supplemental pressure, or to the tank outlet.

With this trailer control valve, to achieve the stated objective it is provided that the valve arrangement comprises a pressure-limiting valve and a shut-off valve, that the pressure-limiting valve and the shut-off valve are arranged in series one behind the other with the shut-off valve arranged fluidically downstream from the pressure-limiting valve, that the outlet pressure of the valve arrangement can be reduced to the supplemental pressure by means of the pressure-limiting valve, and that the shut-off valve is in the form of a 3/2-way solenoid switching valve, by way of which, in its non-energized state the supplemental pressure outlet is connected to the tank outlet, and in its energized state the supplemental pressure outlet is connected to the working outlet of the pressure-limiting valve.

According to the second variant, the invention relates to the same trailer control valve of a towing vehicle for controlling a hydraulic dual-line brake system of a trailer vehicle. This trailer control valve too has a supply pressure inlet for connecting a hydraulic supply line of the towing vehicle, a tank outlet for connecting an unpressurized return-flow line of the towing vehicle, a brake pressure outlet for connecting a brake line of the trailer vehicle, and a supplemental pressure outlet for connecting a supplemental line of the trailer vehicle. The brake pressure outlet can likewise be connected in a stepped manner to the supply pressure inlet or to the tank outlet by means of an electronically controlled brake control valve. In addition, the supplemental pressure outlet can be connected by way of a valve arrangement comprising at least one electronically controlled valve, either to the supply pressure inlet, so reducing an initial pressure value of the supply pressure to a supplemental pressure, or to the tank outlet.

With this second variant of the trailer control valve according to the invention, to achieve the stated objective it is provided that the valve arrangement comprises a pressure-limiting valve and a shut-off valve, that the pressure-limiting valve and the shut-off valve are arranged in series one after another with the shut-off valve arranged fluidically upstream from the pressure-limiting valve, that the outlet pressure of the valve arrangement can be reduced to the supplemental pressure by means of the pressure-limiting valve, and that the shut-off valve is in the form of a 3/2-way solenoid switching valve by means of which, in its non-energized state the supplemental pressure outlet is connected to the tank outlet, and in its energized state the supplemental pressure outlet is connected to the supply pressure inlet.

Thanks to the use of the pressure-limiting valve and the shut-off valve, compared with a proportional solenoid valve the valve arrangement having the features of the invention is simpler to control and is less likely to develop faults. By means of the pressure-limiting valve the supply pressure applied on the inlet side is reduced to the supplemental pressure autonomously, i.e., without any active control measure. Only the shut-off valve has to be actively controlled or energized by a control unit if, depending on the arrangement of the valve, the supplemental pressure or the supply pressure have to be passed on to the supplemental pressure outlet S or the pressure-limiting valve. In the non-energized state of the shut-off valve the supplemental pressure outlet S is vented or unpressurized, so that the trailer vehicle is automatically braked.

To detect the supplemental pressure at the supplemental pressure outlet S, it is advantageous to connect to the supplemental line an electro-hydraulic pressure sensor or an electro-hydraulic pressure switch inside or outside the trailer control valve, close to the supplemental pressure outlet S. With reference to the pressure signal from the pressure sensor or the switching signal from the pressure switch, which is actuated at a pressure slightly lower than the specified supplemental pressure, it can be recognized whether, when the shut-off valve is energized, the specified supplemental pressure exists or has not been reached at the supplemental pressure outlet S. If the pressure at the supplemental pressure outlet S is too low, it is assumed that there is a leak in the supplemental line or a defect in the brake system of the trailer vehicle, which then results in switching off at least of the shut-off valve and hence to emergency braking of the trailer vehicle.

The brake control valve is preferably in the form of a 3/3-way proportional solenoid valve or a 3/2-way proportional solenoid valve with a return flow of the controlled brake pressure to the valve piston on the valve-spring side, by virtue of which, in the non-energized state of the valve, the brake pressure outlet is connected un-throttled to the tank outlet and in the maximally energized state of the valve the brake pressure outlet is connected un-throttled to the supply pressure inlet. Owing to the return-flow of the brake pressure to the valve piston, the brake control valve can be controlled solely by means of an electric control current with reference to a characteristic curve stored in the control unit.

Yet, to detect the brake pressure applied at the brake pressure outlet C an electro-hydraulic pressure sensor can be connected to the brake line inside or outside the trailer control valve close to the brake pressure outlet C. However, this pressure sensor only serves to recognize a leak in the brake line or a defect in the brake system of the trailer vehicle, which results in switching off the brake control valve and the shut-off valve, and hence produces emergency braking of the trailer vehicle.

A different level of the supply pressure at the supply pressure inlet P can result in slight changes of the control characteristic of the brake control valve. Thus, according to another further development of the invention it is advantageous if, to detect the supply pressure at the supply pressure inlet P, an electro-hydraulic pressure sensor is connected to the supply line inside or outside the trailer control valve close to the supply pressure inlet P. In that way, depending on the actual supply pressure the optimum characteristic for controlling the brake control valve can be selected and used.

To detect the coupling status of a trailer vehicle, i.e., to recognize whether or not a trailer vehicle is coupled, according to another design an electrical signal line is connected directly or via the trailer control valve to an associated electronic control unit. This signal line is usually connected to the 7-pole or 13-pole socket for the connecting plug of the trailer vehicle. If when the towing vehicle is started up a coupled trailer vehicle is recognized, then this can be used for the automatic filling of a pressure accumulator of the trailer vehicle, since the brake control valve is maximally energized for a few seconds and thereby pressure oil is delivered into the brake line of the trailer vehicle. In contrast, if it is recognized that no trailer vehicle is coupled, the shut-off valve and the brake control valve are not switched, so that the supplemental pressure outlet and the brake pressure outlet then remain unpressurized.

In order to enable a brake pressure to be produced for the trailer vehicle even if there is a defect in the brake control valve or its control system, a brake pressure inlet PB, PB' and a redundant control branch with a pressure-controlled relay valve are advantageously provided in a brake line of the towing vehicle, for the brake-pressure-controlled production of a brake pressure and the activation of a redundancy valve for activating and deactivating the redundant control branch. By means of this redundancy valve the relay valve is activated, if necessary, whereby the brake pressure at the brake pressure outlet C is adjusted in a brake-pressure-controlled manner by the relay valve instead of by being electronically controlled by the brake control valve.

For that purpose, it is provided that the relay valve is connected to the supply pressure inlet P, to the tank outlet T, and via a shuttle valve to the brake pressure outlet C, and is provided with a control inlet. The redundancy valve is preferably in the form of a 3/2-way solenoid switching valve by means of which, when it is not energized, the control inlet of the relay valve is connected to the brake pressure inlet PB, PB', and when it is energized, then depending on the type of brake system in the towing vehicle (pneumatic or hydraulic), the control inlet of the relay valve is connected to a venting outlet or to the tank outlet T.

With an arrangement of the shut-off valve upstream from the pressure-limiting valve, instead of a connection to the supply pressure inlet P, the relay valve can be connected via a connecting line to the connecting line between the shut-off valve and the pressure-limiting valve in which the supply pressure exists when the shut-off valve is energized. Thus, by switching the shut-off valve off, both the supplemental pressure outlet S and the supply inlet of the relay valve are vented via the shut-off valve and thereby become unpressurized.

With this embodiment, in order to avoid an unforeseen switching off of the shut-off valve and thereby deactivating the redundant control branch, the shut-off valve is preferably secured against defect-related failure by control means that maintain it in its most recent switching state within the associated electronic control unit.

Alternatively, or in addition, for that purpose the shut-off valve can also have a second shut-off valve connected parallel to it, wherein the working outlets of the two shut-off valves are connected by a shuttle valve to the connection line that leads to the pressure-limiting valve, so that if there is a defect in one of the two shut-off valves, pressure oil at the supply pressure can still be supplied to the connection line by the respective other shut-off valve. For cost reasons the second shut-off valve is preferably of a structure identical to that of the first shut-off valve.

A further possibility for avoiding an unintended switching off of the shut-off valve is that in the connecting line between the shut-off valve and the connection point of the connecting line leading to the relay valve, there is arranged a one-way valve with a control inlet that blocks in the direction toward the shut-off valve and can be opened by an actuated control pressure, to which an electronically controlled pilot valve is connected. This pilot valve is in the form of a 3/2-way solenoid switching valve by means of which the control inlet of the one-way valve is connected to the tank outlet T when not energized, and to the supply pressure inlet P when in the energized condition. Thanks to the one-way valve in the connecting line that can be unblocked, when the shut-off valve is not energized the inlet of the pressure-limiting valve and the supply inlet of the relay valve can only be vented by active actuation of the pilot valve and thereby switched to become unpressurized.

At least the brake control valve, the pressure-limiting valve, the shut-off valve, the redundancy valve and the shuttle valve can be accommodated for the same purpose in a shared valve housing and thereby form the trailer control valve. In this case too, the pressure sensors and/or the pressure switch can if necessary be accommodated inside the valve housing or outside the valve housing.

BRIEF DESCRIPTION OF THE DRAWINGS

The trailer control valve with the features of the invention is explained in greater detail with reference to the example embodiments illustrated in the attached drawing, which shows, represented schematically in each case.

DETAILED DESCRIPTION

Figure 1:
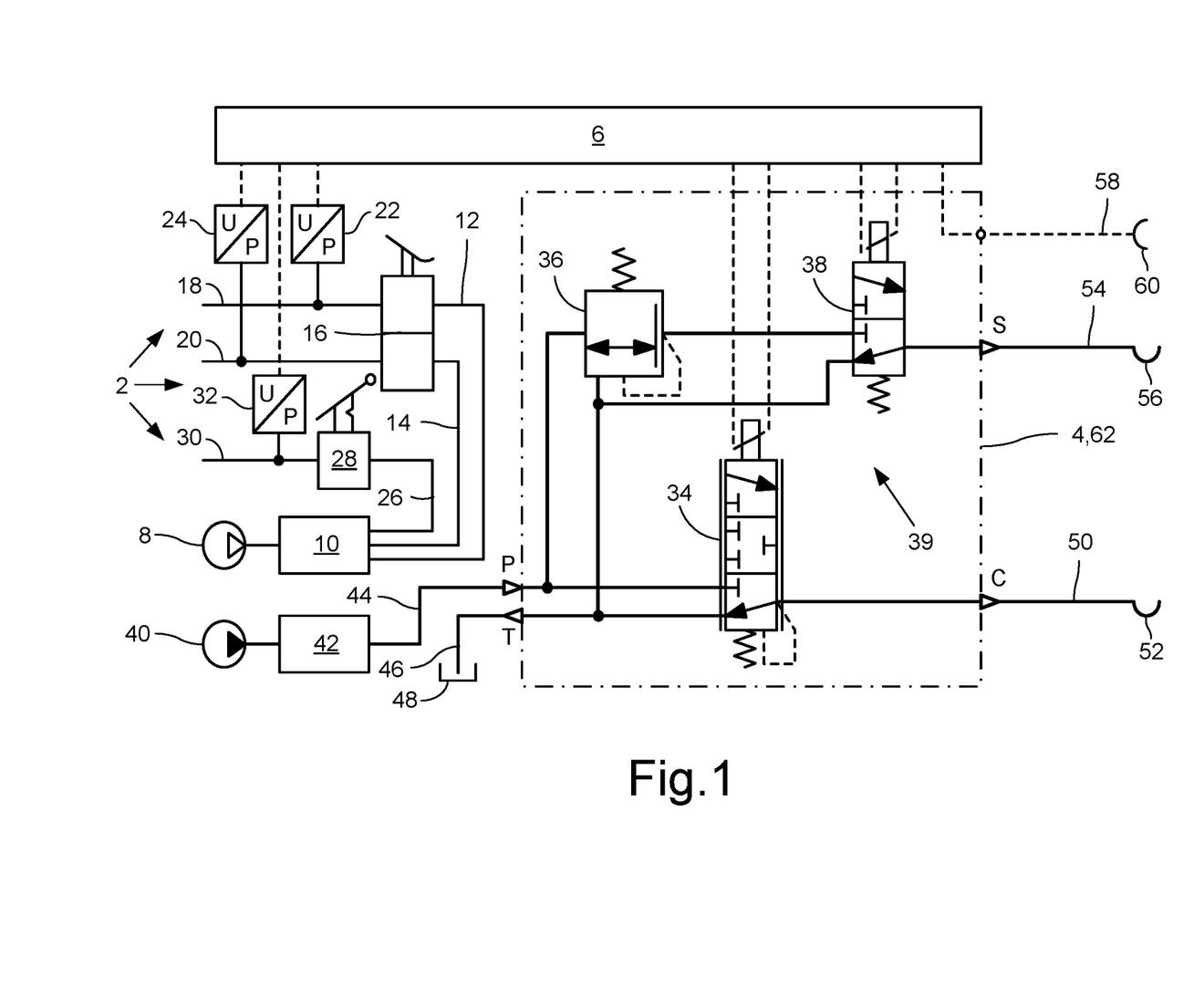
FIG. 1: A basic embodiment of the trailer control valve according to the invention in a brake system of a towing vehicle.

FIG. 1 shows a brake system 2 of a towing vehicle, a trailer control valve 4 arranged in the towing vehicle and an electronic control unit 6 associated therewith. The trailer control valve 4 serves to control a hydraulic dual-line brake system of a coupled trailer vehicle. The brake system 2 of the towing vehicle, only partially shown in FIG. 1, is in this case for example a compressed-air brake system which comprises a compressor 8 and a preparation unit 10. From the preparation unit 10 a first pneumatic supply line 12 for a first service brake circuit and a second pneumatic supply line 14 for a second brake circuit lead to a foot-brake valve 16. By means of the foot-brake valve 16 a brake pressure can be produced in a brake line 18 of the first service brake circuit and in a brake line 20 of the second brake circuit To measure the brake pressure produced therein, in each respective case an electro-pneumatic pressure sensor 22, 24 acting as a brake value emitter is connected to the brake lines 18, 20 and connected to the control unit 6 by sensor lines indicated by broken lines. In addition, from the preparation unit 10 a further pneumatic supply line 26 leads to a parking brake valve 28, by means of which a parking release pressure can be produced in a connected parking brake line 30. To measure the parking release pressure an electro-pneumatic pressure sensor 32 acting as a parking brake sensor is connected to the parking brake line 30 and also connected to the control unit 6 by a sensor line.

The trailer control valve 4 bas a supply pressure inlet P, a tank outlet T, a brake pressure outlet C and a supplemental pressure outlet S, and comprises a brake control valve 34, a pressure-limiting valve 36 and a shut-off valve 38. A hydraulic supply line 44 is connected to the supply pressure inlet P, which line is fed by an oil pump 40 and a preparation unit 42 arranged downstream therefrom. To the tank outlet T is connected a return-flow line 46, which leads to a collecting container 48. To the brake pressure outlet C is connected a brake line 50, which leads to a brake coupling 52 for connecting a brake line on the trailer side. To the supplemental pressure outlet S is connected a supplemental line 54 which leads to a supplemental coupling 56 for connecting a supplemental line on the trailer side. In addition, a signal line 58 runs from the control unit 6 via the trailer control valve 4 to a plug socket 60 for connecting a signal line on the trailer side. The trailer control valve 4 can be made by connecting the valves 34, 36, 38 mentioned, by way of plug connections and/or screw connections, mechanically and hydraulically to one another, or they can be arranged in a shared valve housing 62.

The brake control valve 34 is in the form of a 3/3-way proportional solenoid valve with a return-flow on the valve spring side of the brake pressure produced by the valve piston and is connected to the control unit 6 by an electric control line. It should be mentioned here that all the electric control lines are represented by broken lines. The brake control valve 34 serves to control a brake pressure at the brake pressure outlet C, of between 0 Pa and $150 \times 10^5$ Pa, as a function of a brake value measured by at least one of the pressure sensors 22, 24. By way of the brake control valve 34, when the latter is not energized the brake pressure outlet C is connected unthrottled to the tank outlet T (0 Pa) and when it is fully energized the brake pressure outlet C is connected unthrottled to the supply pressure inlet P under a pressure there, for example, of $150 \times 10^5$ Pa.

When the towing vehicle is started up, the brake pressure outlet C can be acted upon by the maximum brake pressure ($150 \times 10^5$ Pa) for a few seconds by maximum energisation of the brake control valve 34, in order to fill a pressure accumulator of the trailer vehicle with hydraulic oil under high pressure, provided that previously it has been recognized via the signal line 58 (with the plug of the trailer vehicle connected) that a trailer vehicle is in fact coupled.

By means of the pressure-limiting valve 36 the supply pressure applied on the input side is reduced on the output side to a constant supplemental pressure between $15 \times 10^5$ Pa and $35 \times 10^5$ Pa. The shut-off valve 38, which in the present case is connected pneumatically downstream from the pressure-limiting valve 36, is in the form of a 3/2-way solenoid switching valve and is connected to the control unit 6 by an electric control line. By means of this shut-off valve 38, when it is not energized the supplemental pressure outlet S is connected to the tank outlet (0 Pa) and when it is energized the supplemental pressure outlet S is connected to the working outlet of the pressure-limiting valve 36, which can be at a hydraulic pressure between $15 \times 10^5$ Pa and $35 \times 10^5$ Pa.

Once the towing vehicle concerned has been started up, the supplemental pressure outlet S with the release of the parking brake, which is detected by the parking brake sensor 32, is acted upon by energizing the shut-off valve 38 with the intended supplemental pressure ($15 \times 10^5$ Pa to $35 \times 10^5$ Pa), provided that a coupled trailed vehicle has previously been recognized via the signal line 58. If thereafter a defect in the brake system of the trailer vehicle 4 is established or an emergency off-switch is actuated in the towing vehicle or a parking brake of the towing vehicle is engaged by actuating the parking brake valve 28, then the supplemental pressure outlet S is depressurized by switching off the shut-off valve 38 and thereby an emergency braking or secondary braking of the trailer vehicle is triggered. The basic embodiment of the trailer control valve 4 described is advantageously effective without a pressure sensor connected to the brake line 50 and/or to the supplemental line 54.

Figure 2:
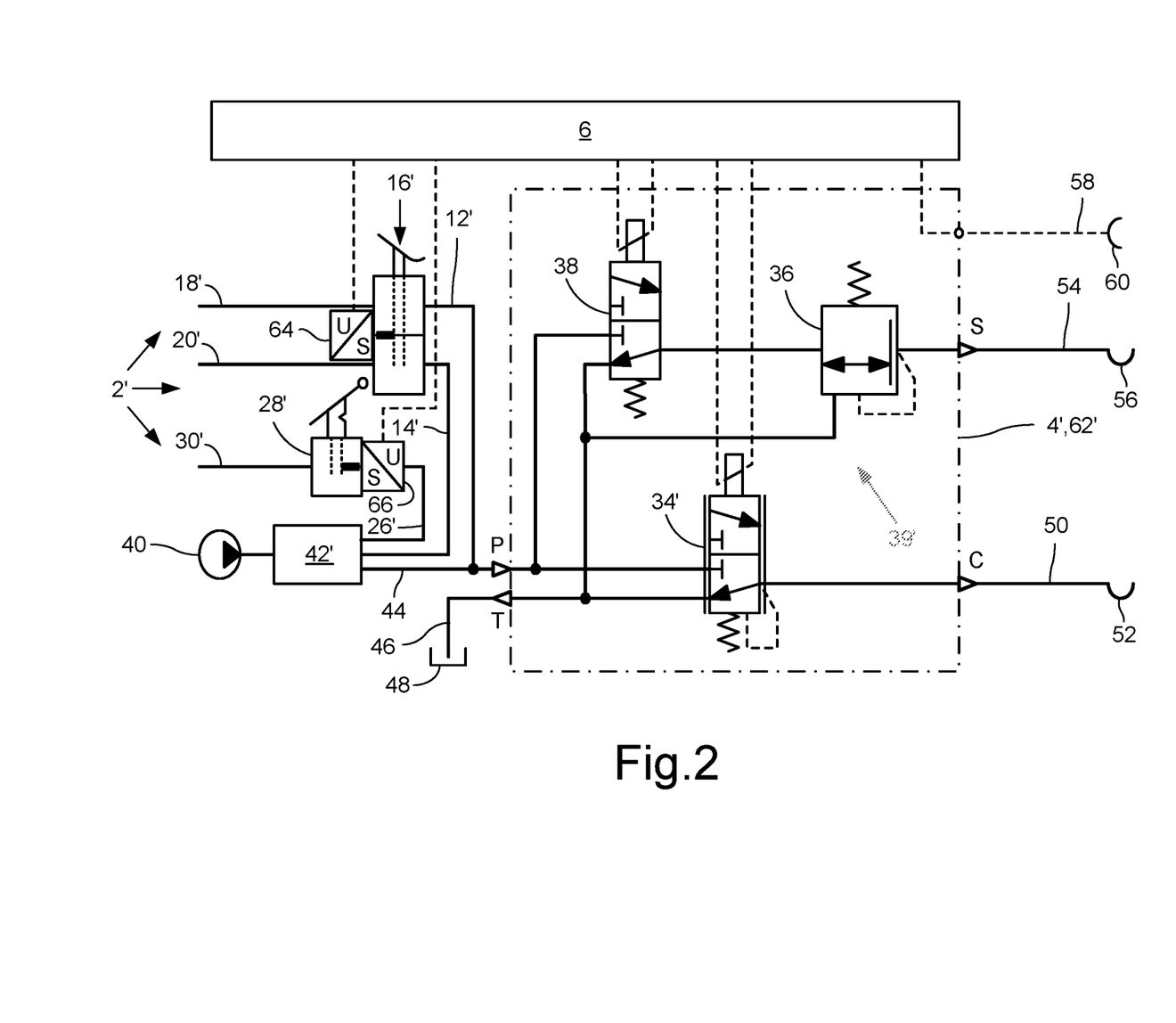
FIG. 2: An alternative basic embodiment of the trailer control valve.

The trailer control valve 4 illustrated in FIG. 2 differs from the trailer control valve 4 in FIG. 1, though having the same functionality, essentially in that in its valve arrangement 39' the shut-off valve 38 is now connected downstream from the pressure-limiting valve 36. Thereby, the inlet of the pressure-limiting valve 36 is connected by the shut-off valve 38, when not energized to the tank outlet T (0 Pa) and when energized to the supply pressure inlet P ($150 \times 10^5$ Pa).

In this example embodiment the brake control valve 34 is in the form of a 3/2-way proportional solenoid valve with a return flow, on the valve spring side, of the controlled brake pressure to the valve piston, which is controlled by the control unit 6. In this case the brake pressure outlet C of the trailer control valve 4' in the non-energized state of the brake control valve 34' is unthrottled, and in the fully energized state the brake control valve 34' is connected to the tank outlet T and unthrottled to the hydraulic supply pressure inlet P.

Furthermore, in the example embodiment shown in FIG. 2 the brake system 2 of the towing vehicle is in the form of a hydraulic brake system. Consequently, the supply lines 12', 14', 26' concerned are now connected to the preparation unit 42' downstream from the oil pump 40, and the supply line inlet P of the trailer control valve 4' is connected to the supply line 12' of the first service brake circuit. In this case, as the brake value emitter for example an adjustment path sensor 64 is provided, which is arranged on the foot-brake valve 16' and is connected to the control unit 6 by way of a sensor line. The switching state of the parking brake valve 28' is now detected by a switching sensor 66 that acts as a parking brake sensor, which is connected to the control unit 6 by a sensor line.

Figure 3:
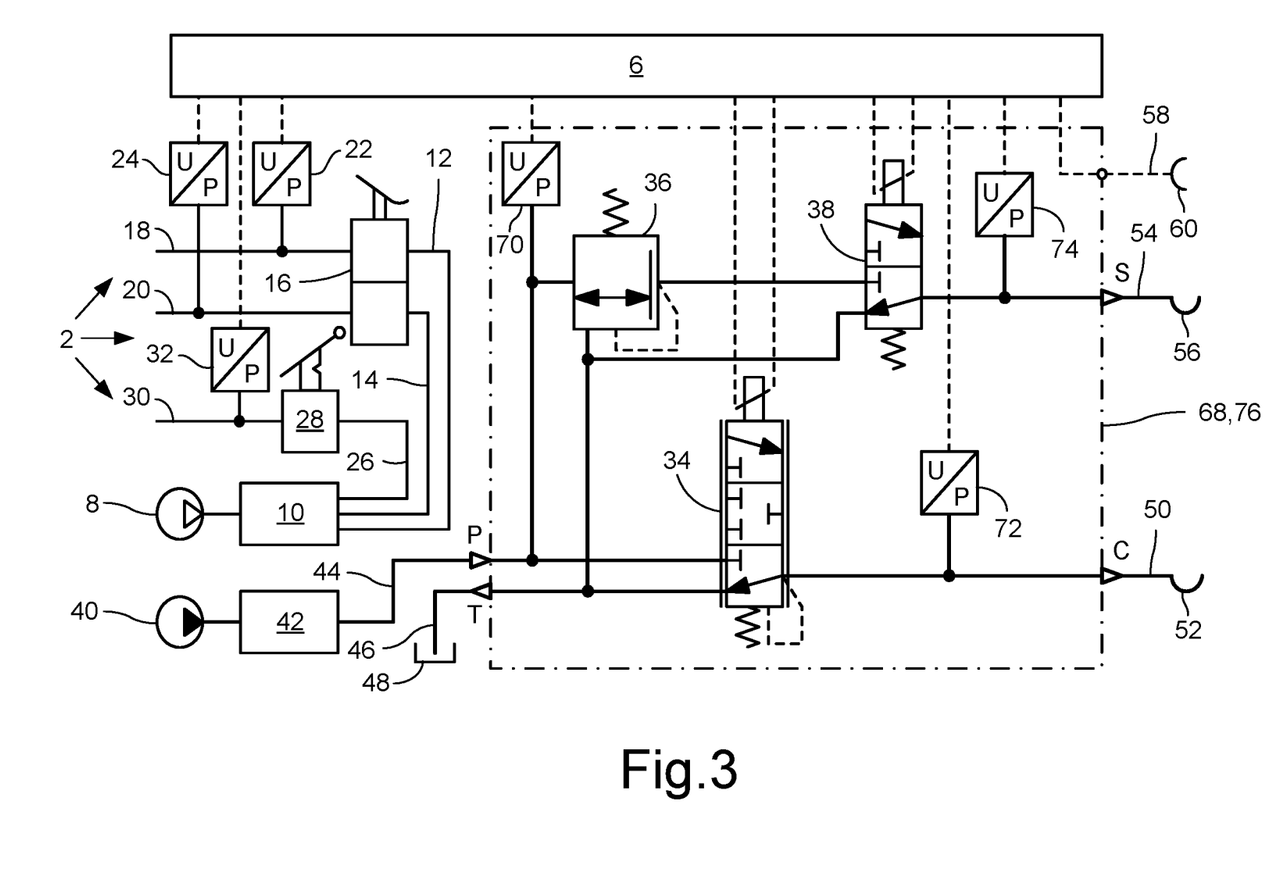
FIG. 3: An extension of the trailer control valve shown in FIG. 1, FIG. 4: An alternative extension of the trailer control valve shown in FIG. 1, FIG. 5: An extension of the trailer control valve shown in FIG. 3, FIG. 6: An extension of the trailer control valve shown in FIG. 2, FIG. 7: A first further development of the trailer control valve shown in FIG. 6, and FIG. 8: An alternative, second further development of the trailer control valve shown in FIG. 6.

FIG. 3 illustrates a trailer control valve 68 which has the features of the invention, which compared with the trailer control valve 4 shown in FIG. 1 is extended by three electro-hydraulic pressure sensors 70, 72, 74. The first pressure sensor 70 is connected to the already-mentioned hydraulic supply line 44 and is connected by way of a sensor line to the control unit 6. Measurement of the supply pressure existing at the supply pressure inlet P enables a more accurate adjustment of the brake pressure at the brake pressure outlet C by means of the brake control valve 34, since depending on the supply pressure on the inlet side, there may be slight changes of the control characteristics stored in the control unit 6 for the brake control valve 34. Thus, depending on the current supply pressure the respective optimum characteristic for controlling the brake control valve 34 can be selected and used.

The second pressure sensor 72 is connected to the brake line 50 and is also connected to the control unit 6 by a sensor line. Measurement of the brake pressure at the brake pressure outlet C can detect a deviation from the brake pressure to be set by the brake control valve 34, which deviation indicates a defect in the brake system on the trailer side or a leak in the brake line 50. Consequently, a visual or acoustic warning signal can be emitted in the driver's cabin of the towing vehicle and/or, by switching off the brake control valve 34 and the shut-off valve 38, an emergency braking of the trailer vehicle can be triggered and the escape of pressure oil into the surroundings can be prevented.

The third pressure sensor 74 is connected to the supplemental line 54 and again to the control unit 6 by way of a sensor line. Measurement of the supplemental pressure at the supplemental pressure outlet S can detect a deviation from the supplemental pressure to be set by the pressure-limiting valve 36, which deviation indicates a defect in the brake system on the trailer side or a leak in the supplemental line 58. As a result, a visual or acoustic warning signal can be emitted in the driver's cabin of the towing vehicle and/or, by switching off at least the shut-off valve 38 an emergency braking of the trailer vehicle can be triggered and the escape of pressure oil into the surroundings can be prevented.

In the representation shown in FIG. 3 the three pressure sensors 70, 72, 74 are arranged inside the trailer control valve 68. This should make it clear that the pressure sensors 70, 72, 74 can be connected to their respective lines or valves 34, 36, 38 by means of plug connections and/or screw connections, and can therefore form the trailer control valve 68. Moreover, it is made clear that those pressure sensors 70, 72, 74 together with the valves 34, 36, 38 and the lines concerned can be accommodated in a shared valve housing 76. However, it is also possible for the pressure sensors 70, 72, 74 to be connected outside the trailer control valve 68 to their respective pressure lines 44, 50, 54.

Figure 4:
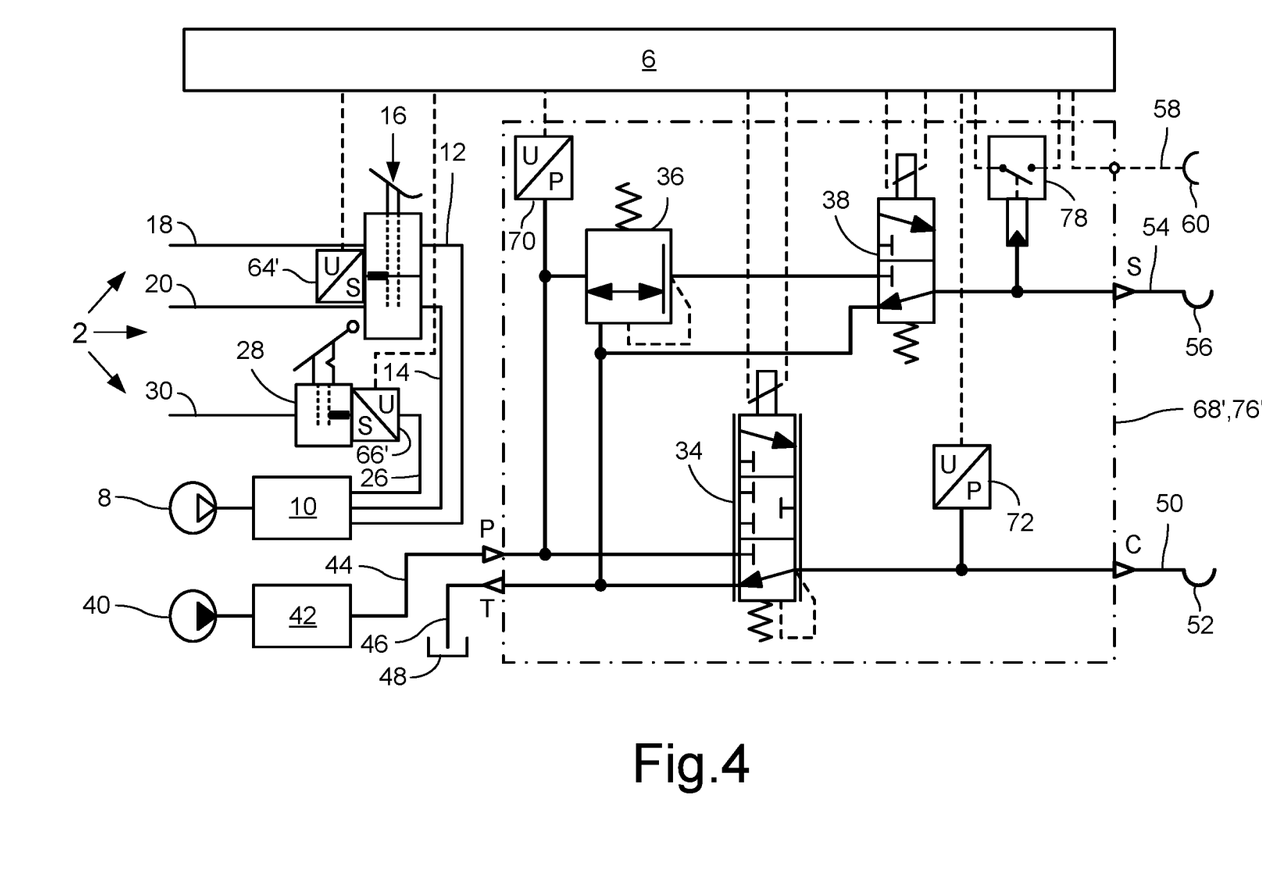

The further embodiment of a trailer control valve 68' shown in FIG. 4 differs from the trailer control valve 68 in FIG. 3, in that instead of the pressure sensor 74 between the shut-off valve 38 and the supplemental pressure outlet S, there is now an electro-hydraulic pressure switch 78 connected to the supplemental line 54 and also connected to the control unit 6 by a signal line. With reference to the switching signal of the pressure switch 78, which is actuated by a supplemental pressure slightly below the intended supplemental pressure, the control unit 6 can recognize whether, when the shut-off valve 38 is energized, the intended supplemental pressure exists at the supplemental pressure outlet S or has not been reached. If the pressure at the supplemental pressure outlet S is too low, a defect in the brake system of the trailer vehicle or a leak in the supplemental line 58 can be assumed, which results in switching off at least of the shut-off valve 38 and hence to an emergency braking of the trailer vehicle. Moreover, FIG. 4 makes it clear that with a brake system 2 of the towing vehicle in the form of a compressed-air brake system as well, instead of the pressure sensors 22, 24, 26 provided as in FIGS. 1 and 3, an adjustment path sensor 64' as the brake value emitter and a switching sensor 66' on the parking brake valve 28 can be used.

Figure 5:
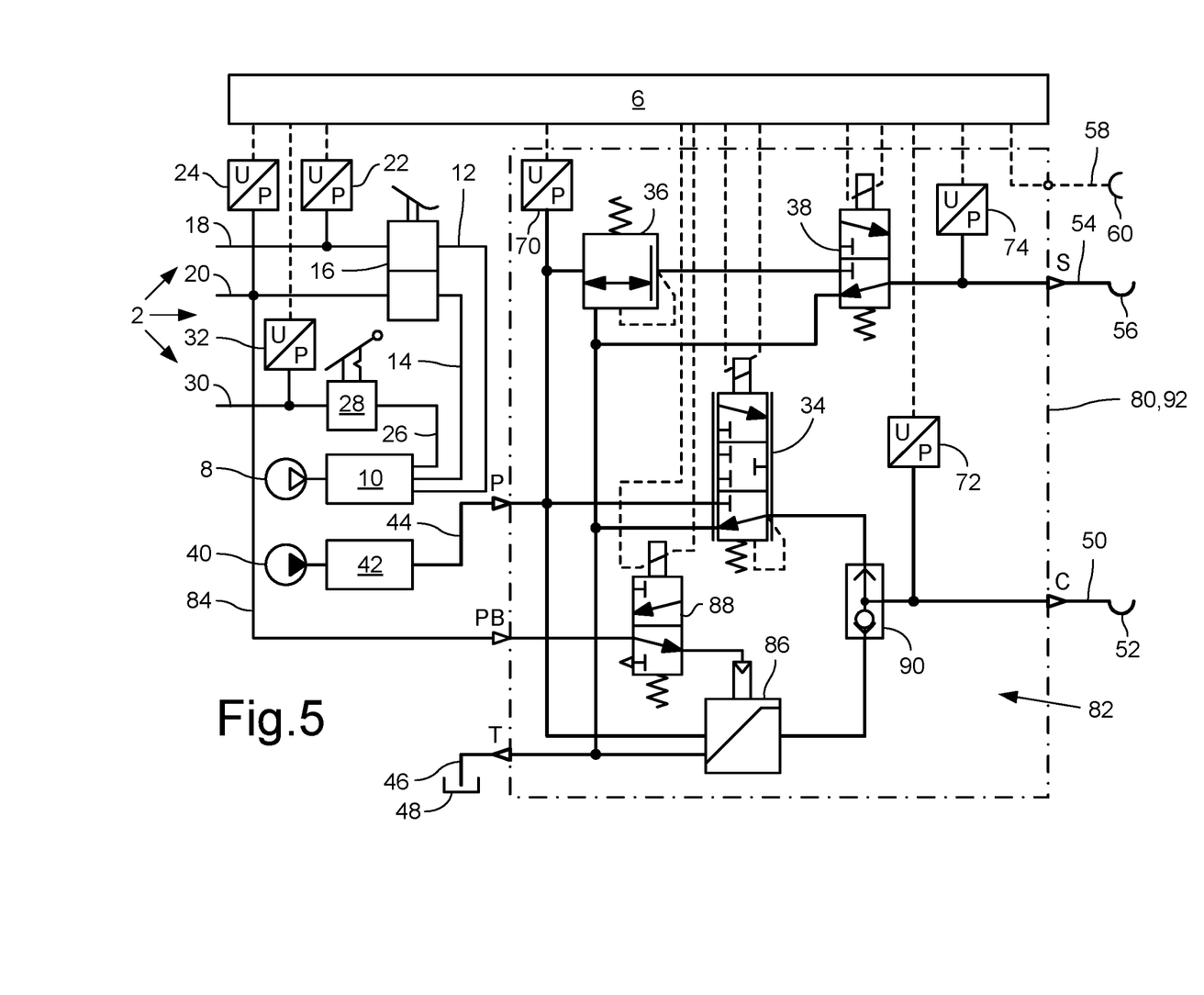

FIG. 5 shows a trailer control valve 80, which compared with the trailer control valve shown in FIG. 3, is extended by means of a pneumatic brake pressure inlet PB and a redundant control branch 82. The pneumatic brake pressure inlet PB is connected by a connecting line 84 to the brake line 20 of the second brake circuit of the towing vehicle. The redundant control branch 82 comprises a pneumatic pressure-controlled relay valve 86, a redundancy valve 88 and a shuttle valve 90. The relay valve 86 is connected to the supply pressure inlet P and the tank outlet T by way of the shuttle valve 90. To the shuttle valve 90 are also connected the working outlet of the brake control valve 34 and the brake pressure outlet C. The control inlet of the relay valve 86 can be connected to the brake pressure inlet PB by way of the redundancy valve 88. The redundancy valve 88 is in the form of a 3/2-way solenoid switching valve and is connected to the control unit 6 via an electric control line.

By way of the redundancy valve 88, the control inlet of the relay valve 86 is connected to the brake pressure inlet PB when the valve 88 is not energized and to a venting outlet when it is energized. Thus, in the non-energized state of the redundancy valve 88 the relay valve 86 and therefore the redundant control branch 82 are activated, and in the energized state of the redundancy valve 88 they are deactivated. Thus, in the event of a failure of the control unit 6, the brake control valve 34 is automatically deactivated and the redundant control branch 82 is activated, whereby during driving operation the production of a brake pressure at the brake pressure outlet C is ensured in all circumstances.

The trailer control valve 80 can be formed by connecting the valves 34, 36, 38, 86, 88, 90 to one another by plug and/or screw connections, or they can be arranged in a common valve housing 92. In the present case the three pressure sensors 70, 72, 74 mentioned are also arranged inside the trailer control valve 80. This makes it clear that the pressure sensors 70, 72, 74 are connected by plug and/or screw connections to the valves 34, 36, 38, 86, 88, 90 concerned and can therefore form the trailer control valve 80, or that the pressure sensors 70, 72, 74 can be arranged with the valves 34. 36, 38, 86, 88, 90 concerned in a common valve housing 92. However, it is also possible for the pressure sensors 70, 72, 74 to be connected to the pressure lines respectively associated with them outside the trailer control valve 80.

Figure 6:
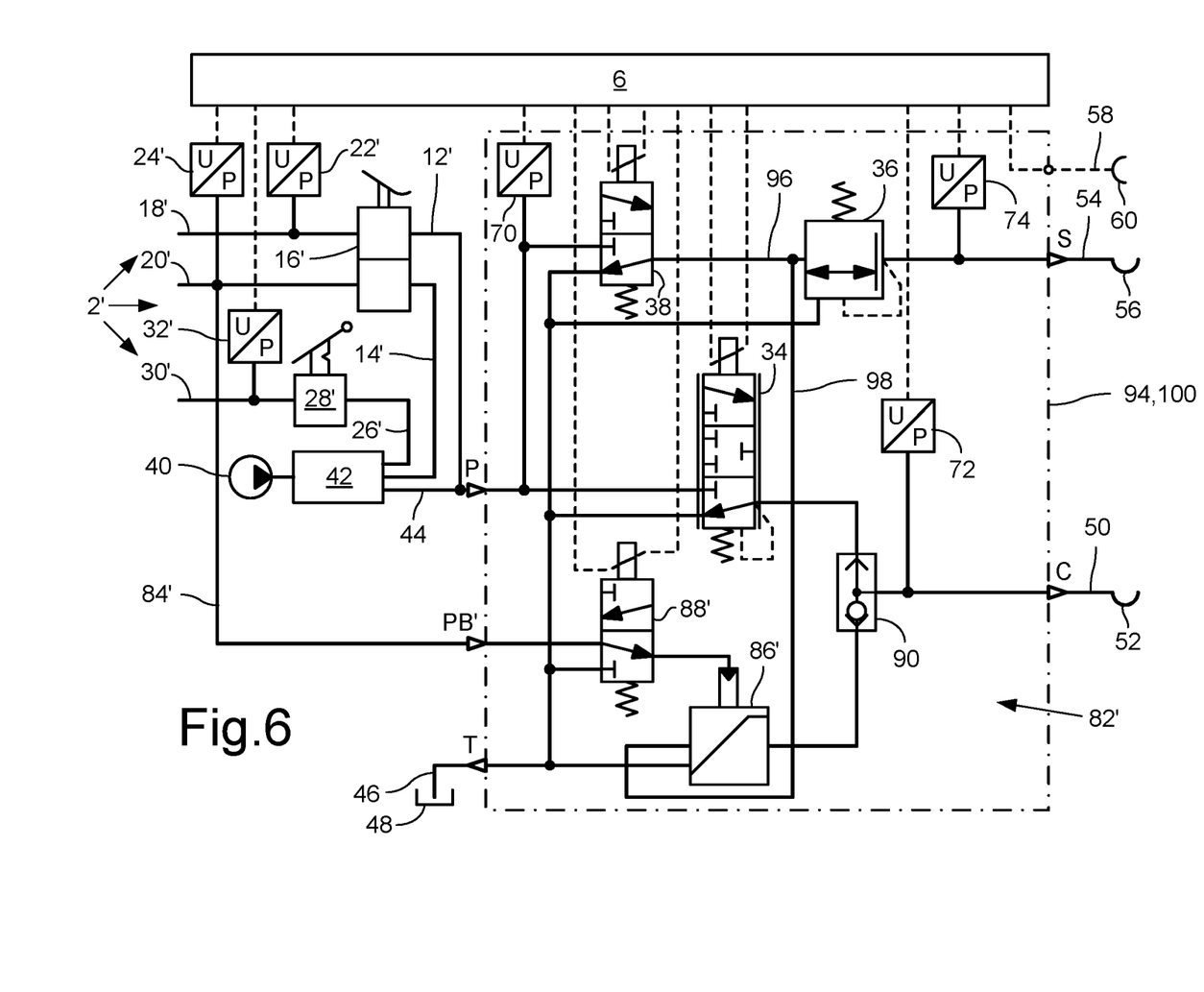

FIG. 6 shows a trailer control valve 94 according to the invention, which for example is based largely on the trailer control valve 4' according to FIG. 2 but, like the embodiments shown in FIGS. 3, 4 and 5, is provided with pressure sensors 70, 72, 74 and also comprises a hydraulic brake pressure inlet PB' and a redundant control branch 82'. Furthermore, the hydraulic brake system 2' of the towing vehicle is for example equipped with pressure sensors 22', 24', 32' for measuring the brake pressures in the associated brake lines 18', 29' and the brake releasing pressure in the parking brake line 30'.

The brake pressure inlet PB' is connected by a connecting line 84' to the brake line 20' of the second hydraulic brake circuit of the towing vehicle. The redundant control branch 82' is made similarly to that shown in FIG. 5 and comprises a hydraulic pressure-controlled relay valve 86', a redundancy valve 88', and a shuttle valve 90. The supply inlet of the relay valve 86', however, instead of being connected to the supply pressure inlet P, is now connected by a connecting line 98 to a connecting line 96 between the shut-off valve 38 and the pressure-limiting valve 36. Furthermore, the relay valve 86' is connected to the tank outlet T and by the shuttle valve 90 to the brake pressure outlet C. The control inlet of the relay valve 86' can be connected by the redundancy valve 88' to the brake pressure inlet PB'. The redundancy valve 88' is in the form of a 3/2-way solenoid switching valve and is connected to the control unit 6 by an electric control line. By way of the redundancy valve 88' the control inlet of the relay valve 86' is connected to the brake pressure inlet PB' when the valve 88' is not energized and to the tank outlet T when it is energized.

Since the supply inlet of the relay valve 86' is only connected to the supply pressure inlet P via the connecting line 96 and the connecting line 98 when the shut-off valve 38 is energized, and is then at the supply pressure, particular measures are provided in order to avoid an unintentional switching-off of the shut-off valve 38 and a consequent deactivation of the redundant control branch 82'. Thus, in the present case it is provided that the shut-off valve 38 is secured against a defect-related failure by control means within the electronic control unit 6 which maintain its most recent switched state.

Figure 7:
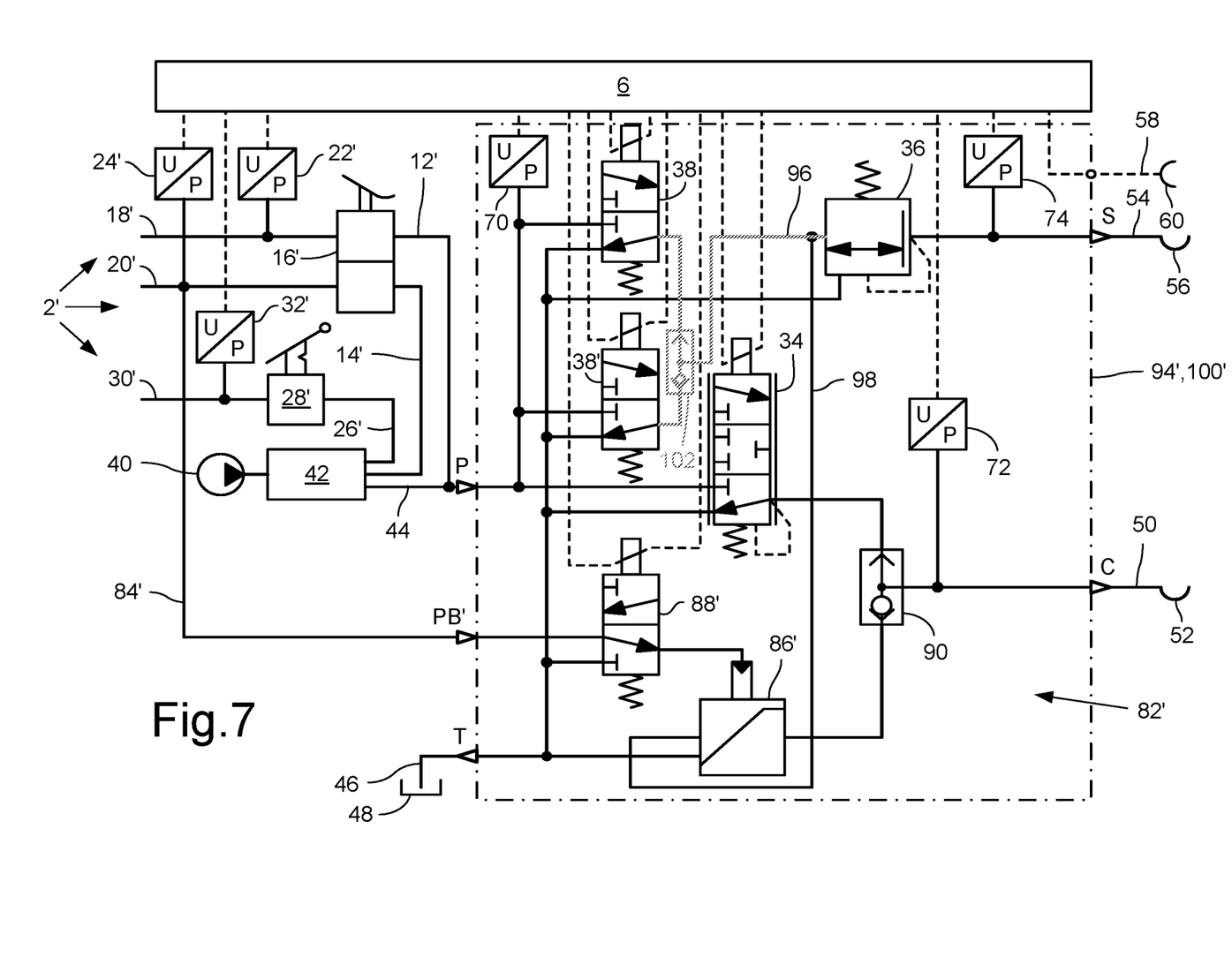

For that purpose, in the trailer control valve 94' shown in FIG. 7, while its design is in other respects the same, alternatively or in addition a second shut-off valve 38' is provided. which is connected in parallel with the first shut-off valve 38 and preferably has an identical structure. The working outlets of the two shut-off valves 38, 38' are connected by a shuttle valve 102 to the connecting line 96 that leads to the pressure-limiting valve 36. If there is a defect in one of the two shut-off valves 38, 38', pressure oil can still be delivered at the supply pressure into the connecting line 96 by way of the respective other shut-off valve (38 or 38').

Figure 8:
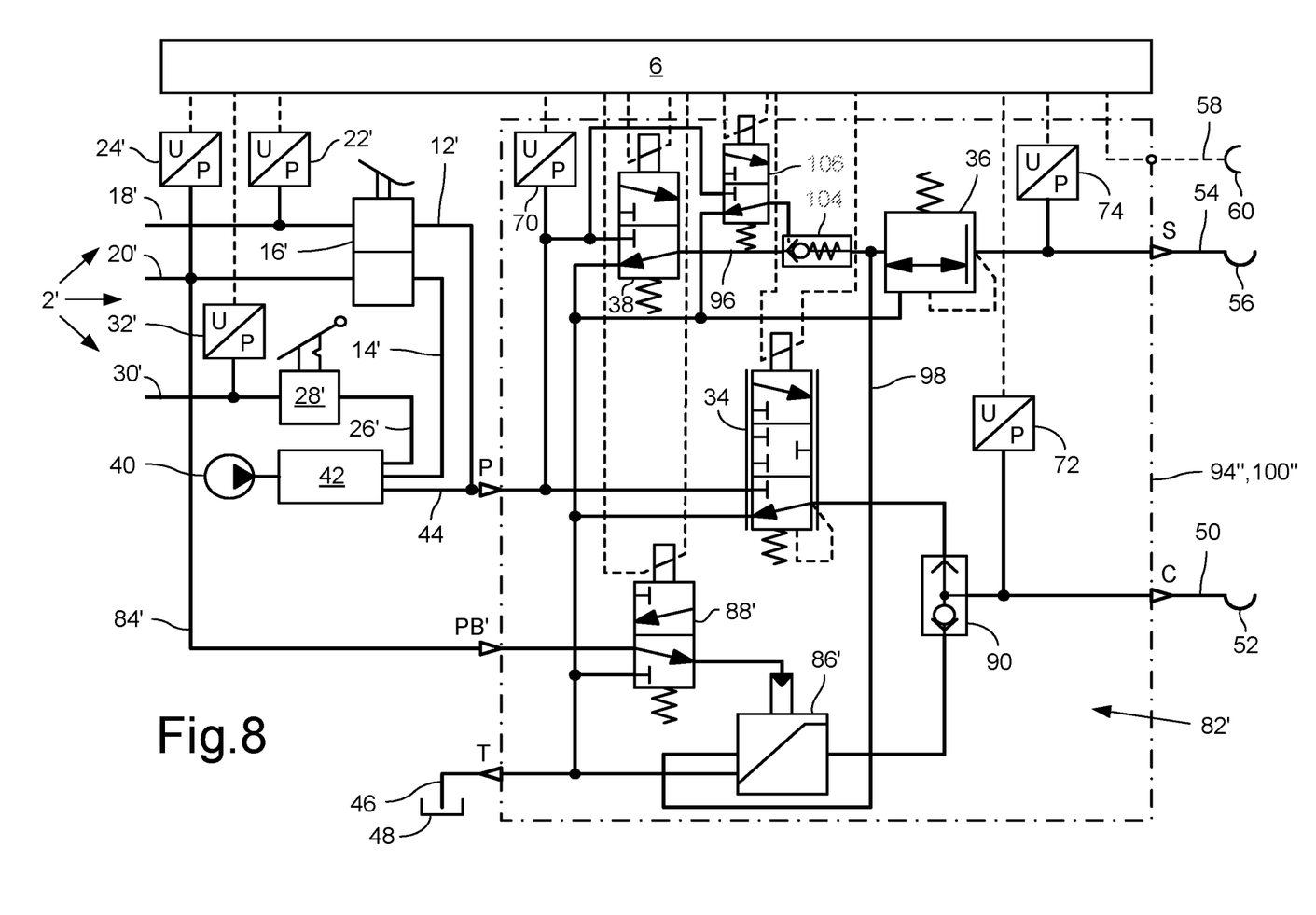

In the trailer control valve 94" shown in FIG. 8, while its design is in other respects the same as that of the trailer control valve 94 in FIG. 6, a further possibility for avoiding an unintentional switching-off of the shut-off valve 38 is shown. In this case, in the connecting line 96 between the shut-off valve 38 and the connection point of the connecting line 96 that leads to the relay valve 86' there is connected a one-way valve 104 with a control inlet, which blocks in the direction toward the shut-off valve 38 but can be unblocked by an applied control pressure, to which valve an electronically controlled pilot valve 106 is connected. The pilot valve 106 is in the form of a 3/2-way solenoid switching valve, by means of which the control inlet of the one-way valve 104, when the valve 106 is not energized, is connected to the tank outlet T, and when the valve 106 is energized, is connected to the supply pressure inlet P. By virtue of the one-way valve 104 in the connecting line 96 that can be unblocked, when the shut-off valve 38' is not energized the inlet of the pressure-limiting valve 36 and the supply inlet of the relay valve 96' can only be vented by positive actuation, i.e., by energizing the pilot valve 106, and can thereby be depressurized.

The trailer control valves 94, 94', 94" illustrated can respectively be formed by connecting the valves 34, 36, 38, 86' 88' 90 and in addition the valves 38' or 102, 104 to one another by means of plug and/or screw connections, or arranging them in a common valve housing 100, 100', 100". In the present case the three pressure sensors 70, 72, 74 are also arranged inside the respective trailer control valve 94, 94', 94". This makes it clear that the pressure sensors 70, 72, 74 can be connected by plug and/or screw connections to the associated valves 34, 36, 38, 86', 90 and can thus form the trailer control valve 94, 94', 94" concerned, or that the pressure sensors 70, 72, 74 together with the associated valves 34, 36, 38, 86', 88', 90, and in addition with the valves 38' or 102, 104, can be arranged in a respective common valve housing 100, 100', 100". However, it is also possible for the pressure sensors 70, 72, 74 to be connected outside the respective trailer control valve 100, 100', 100" to the respectively associated pressure line 12', 50, 54.

LIST OF INDEXES

2 Brake system, compressed-air brake system
2' Brake system (hydraulic)
4, 4' Trailer control valve (first or second embodiment)
6 Electronic control unit
8 Compressor
10 Preparation unit
12, 12' First planetary supply line
14, 14' Second pneumatic supply line
16, 16' Foot-brake valve (first or second embodiment)
18, 18' Brake line of the first service brake circuit
20, 20' Brake line of the second service brake circuit
22, 22' Pressure sensor on the brake line 18, 18', brake value emitter
24, 24' Pressure sensor on the brake line 20, 20', brake value emitter
26, 26' Further pneumatic supply line
28, 28' Parking brake valve (first or second embodiment)
30, 30' Parking brake line
32, 32' Pressure sensor on the parking brake line 30, 30', parking brake sensor
34 Brake control valve (in the form of a 3/3-way proportional solenoid valve)
34' Brake control valve (in the form of a 3/2-way proportional solenoid valve)
36 Pressure-limiting valve
38 First shut-off valve, 3/2-way solenoid switching valve
38' Second shut-off valve, 3/2-way solenoid switching valve
39 Valve arrangement (first embodiment)

39' Valve arrangement (second embodiment)
40 Oil pump
42, 42' Preparation unit
44 Preparation unit (first or second embodiment)
46 Return flow line
48 Collecting container
50 Brake line
52 Brake coupling
54 Supplemental line
56 Supplemental coupling
58 Signal line
60 Plug socket
62, 62' Valve housing (first or second embodiment)
64, 64' Adjustment path sensor (first or second embodiment)
66, 66' Switching sensor, parking brake sensor (first or second embodiment)
68 Trailer control valve (third embodiment)
68' Trailer control valve (fourth embodiment)
70 Pressure sensor
72 Pressure sensor
74 Pressure sensor
76, 76' Valve housing (third or fourth embodiment)
78 Pressure switch
80 Trailer control valve (fifth embodiment)
82, 82' Redundant control branch (first or second embodiment)
84, 84' Connecting line (first or second embodiment)
86, 86' Relay valve (first or second embodiment)
88, 88' Redundancy valve, 3/2-way solenoid switching valve (first or second embodiment)
90 First shuttle valve
92 Valve housing (fifth embodiment)
94 Trailer control valve (sixth embodiment)
94' Trailer control valve (seventh embodiment)
94" Trailer control valve (eighth embodiment)
96 Connecting line
98 Connecting line
100 Valve housing (fourth embodiment)
100' Valve housing (fifth embodiment)
100" Valve housing (fifth embodiment)
102 Second shuttle valve
104 One-way valve
106 Pilot valve, 3/2-way solenoid switching valve
C Brake pressure outlet
P Supply pressure inlet

The invention claimed is:

1. A trailer control valve of a towing vehicle for controlling a hydraulic dual-line brake system of a trailer vehicle, the trailer control valve comprising:
 a supply pressure inlet for the connection of a hydraulic supply line of the towing vehicle;
 a tank outlet for the connection of an unpressurized return-flow line of the towing vehicle;
 a brake pressure outlet for the connection of a brake line of the trailer vehicle; and
 a supplementary pressure outlet for the connection of a supplementary line of the trailer vehicle;
 wherein the brake pressure outlet is configured to be connected in a stepped manner by means of an electronically controlled brake control valve to the supply pressure inlet or to the tank outlet;
 wherein the supplementary pressure outlet is configured to be connected by way of a valve arrangement with at least one electronically controlled valve either to the supply pressure inlet, resulting in the reduction of an initial value of the supply pressure to a supplementary pressure, or connected to the tank outlet;
 wherein the valve arrangement comprises a pressure-limiting valve and a shut-off valve;
 wherein the pressure-limiting valve and the shut-off valve are arranged in series one after the other with the shut-off valve arranged fluidically downstream from the pressure-limiting valve;
 wherein the initial pressure of the valve arrangement can be reduced to the supplemental pressure by means of the pressure-limiting valve; and
 wherein the shut-off valve is in the form of a 3/2-way solenoid switching valve by means of which, when it is not energized, the supplemental pressure outlet is connected to the tank outlet but, when it is energized, the supplemental pressure outlet is connected to the working outlet of the pressure-limiting valve.

2. The trailer control valve according to claim 1, comprising an electro-hydraulic pressure sensor or an electro-hydraulic pressure switch connected to the supplemental line inside or outside the trailer control valve and close to the supplemental pressure outlet, wherein the electro-hydraulic pressure sensor or the electro-hydraulic pressure switch is configured to detect the supplemental pressure present at the supplemental pressure outlet.

3. The trailer control valve according to claim 1, wherein the brake control valve is in the form of a 3/3-way proportional solenoid valve or a 3/2-way proportional solenoid valve with a return flow of the brake pressure produced on the valve spring side to the valve piston, by means of which valve, when it is not energized, the brake pressure outlet is connected unthrottled to the tank outlet, and when it is fully energized, the brake pressure outlet is connected unthrottled to the supply pressure inlet.

4. The trailer control valve according to claim 1, comprising an electro-hydraulic pressure sensor connected to the brake line inside or outside the trailer control valve and close to the brake pressure outlet, the electro-hydraulic pressure sensor configured to detect the brake pressure at the pressure outlet.

5. The trailer control valve according to claim 1, comprising an electro-hydraulic pressure sensor connected to the supplemental line inside or outside the trailer control valve and close to the supply pressure inlet, the electro-hydraulic pressure sensor configured to detect the supply pressure at the supply pressure inlet.

6. The trailer control valve according to claim 1, comprising an electric signal line connected to an associated electronic control unit directly, or via the trailer control valve, the electronic control unit configured to detect the coupling status of the trailer vehicle.

7. The trailer control valve according to claim 1, comprising a brake pressure inlet connected to a brake line of the towing vehicle and a redundant control branch with a pressure-controlled relay valve for the brake-pressure-dependent adjustment of a brake pressure, and a redundancy valve for activating and deactivating the redundant control branch.

8. The trailer control valve according to claim 7, wherein:
 the relay valve is connected to the supply pressure inlet, the tank outlet and, via a shuttle valve, to the brake pressure outlet, and is provided with a control inlet; and
 the redundancy valve is in the form of a 3/2-way solenoid switching valve by means of which, when it is not energized, the control inlet of the relay valve is connected to the brake pressure inlet and, when it is energized, the relay valve is connected to a venting outlet or to the tank outlet.

9. The trailer control valve according to claim 1, wherein at least the brake control valve, the pressure-limiting valve, the shut-off valve, the relay valve, the redundancy valve, and the shuttle valve are connected to one another by plug and/or screw connections.

10. The trailer control valve according to claim 1, wherein at least the brake control valve, the pressure-limiting valve, the shut-off valve, the relay valve, the redundancy valve and the shuttle valve are arranged in a common valve housing.

11. A trailer control valve of a towing vehicle for controlling a hydraulic dual-line brake system of a trailer vehicle, the trailer control valve comprising:
   a supply pressure inlet for the connection of a hydraulic supply line of the towing vehicle;
   a tank outlet for the connection of an unpressurized return-flow line of the towing vehicle;
   a brake pressure outlet for the connection of a brake line of the trailer vehicle; and
   a supplementary pressure outlet for the connection of a supplementary line of the trailer vehicle;
   wherein the brake pressure outlet is configured to be connected in a stepped manner by means of an electronically controlled brake control valve to the supply pressure inlet or to the tank outlet;
   wherein the supplementary pressure outlet is configured to be connected by way of a valve arrangement with at least one electronically controlled valve either to the supply pressure inlet, resulting in the reduction of an initial value of the supply pressure to a supplementary pressure, or to the tank outlet;
   wherein the valve arrangement comprises a pressure-limiting valve and a shut-off valve;
   wherein the pressure-limiting valve and the shut-off valve are arranged in series one after the other with the shut-off valve arranged fluidically upstream from the pressure-limiting valve;
   wherein the initial pressure of the valve arrangement can be reduced to the supplemental pressure by means of the pressure-limiting valve; and
   wherein the shut-off valve is in the form of a 3/2-way solenoid switching valve by means of which, when it is not energized, the supplemental pressure outlet is connected to the tank outlet but, when it is energized, the supplemental pressure outlet is connected to the supply pressure inlet.

12. The trailer control valve according to claim 11, wherein, to detect the supplemental pressure present at the supplemental pressure outlet, an electro-hydraulic pressure sensor or an electro-hydraulic pressure switch is connected to the supplemental line inside or outside the trailer control valve and close to the supplemental pressure outlet.

13. The trailer control valve according to claim 11, wherein the brake control valve is in the form of a 3/3-way proportional solenoid valve or a 3/2-way proportional solenoid valve with a return flow of the brake pressure produced on the valve spring side to the valve piston, by means of which valve, when it is not energized, the brake pressure outlet is connected unthrottled to the tank outlet, and when it is fully energized, the brake pressure outlet is connected unthrottled to the supply pressure inlet.

14. The trailer control valve according to claim 11, wherein to detect the brake pressure at the brake pressure outlet, an electro-hydraulic pressure sensor is connected to the brake line inside or outside the trailer control valve and close to the brake pressure outlet.

15. The trailer control valve according to claim 11, wherein to detect the supply pressure at the supply pressure inlet, an electro-hydraulic pressure sensor is connected to the supplemental line inside or outside the trailer control valve and close to the supply pressure inlet.

16. The trailer control valve according to claim 11, comprising an electric signal line connected to an associated electronic control unit directly, or via the trailer control valve, wherein the associated electronic control unit is configured to detect the coupling status of the trailer vehicle.

17. The trailer control valve according to claim 11, comprising a brake pressure inlet connected to a brake line of the towing vehicle and a redundant control branch with a pressure-controlled relay valve for the brake-pressure-dependent adjustment of a brake pressure, and a redundancy valve for activating and deactivating the redundant control branch.

18. The trailer control valve according to claim 17, wherein:
   the relay valve is connected to the supply pressure inlet, the tank outlet and, via a shuttle valve, to the brake pressure outlet, and is provided with a control inlet; and
   the redundancy valve is in the form of a 3/2-way solenoid switching valve by means of which, when it is not energized, the control inlet of the relay valve is connected to the brake pressure inlet and, when it is energized, the relay valve is connected to a venting outlet or to the tank outlet.

19. The trailer control valve according to claim 11, wherein the supply inlet of the relay valve is connected by way of a connecting line to the connecting line between the shut-off valve and the pressure-limiting valve.

20. The trailer control valve according to claim 19, wherein by virtue of control means within the associated electronic control unit that maintain a most recent switching state of the shut-off valve, the shut-off valve is secured against a defect-related failure.

21. The trailer control valve according to claim 19, comprising a second shut-off valve connected in parallel with the shut-off valve, wherein the second shut-off valve has a structure identical to that of the first shut-off valve, and the working outlets of the two shut-off valves are connected by a shuttle valve to the connecting line that leads to the pressure-limiting valve.

22. The trailer control valve according to claim 20, comprising, in the connecting line between the shut-off valve and the connection to the connecting line that leads to the relay valve, a one-way valve that blocks in the direction toward the shut-off valve and that can be unblocked by means of an applied control pressure, the one-way valve having a control inlet connected to an electronically controlled pilot valve, and wherein the pilot valve is in the form of a 3/2-way solenoid switching valve by means of which, when the pilot valve is not energized the control inlet of the one-way valve is connected to the tank outlet and when the pilot valve is energized the control inlet of the one-way valve is connected to the supply pressure inlet.

* * * * *